US012674584B2

(12) United States Patent
Pamphile et al.

(10) Patent No.: US 12,674,584 B2
(45) Date of Patent: Jul. 7, 2026

(54) HIGH TECH STOVE FIRE DETECTOR AND SUPPRESSION SYSTEM

(71) Applicants: William Pamphile, Malden, MA (US); Lande Pamphile, Malden, MA (US); William Pamphile, II, Malden, MA (US); Willande Pamphile, Malden, MA (US); Wilmayer Pamphile, Malden, MA (US)

(72) Inventors: William Pamphile, Malden, MA (US); Lande Pamphile, Malden, MA (US); William Pamphile, II, Malden, MA (US); Willande Pamphile, Malden, MA (US); Wilmayer Pamphile, Malden, MA (US)

( * ) Notice: Subject to any disclaimer, the term of this patent is extended or adjusted under 35 U.S.C. 154(b) by 258 days.

(21) Appl. No.: 18/452,202

(22) Filed: Aug. 18, 2023

(65) Prior Publication Data

US 2025/0060109 A1     Feb. 20, 2025

(51) Int. Cl.
*A62C 3/00* (2006.01)
*F24C 15/20* (2006.01)
*H04N 7/18* (2006.01)

(52) U.S. Cl.
CPC .......... *F24C 15/2021* (2013.01); *A62C 3/006* (2013.01); *F24C 15/2064* (2013.01); *H04N 7/18* (2013.01)

(58) Field of Classification Search
CPC ....... A62C 3/006; H04N 7/18; F24C 15/2021; F24C 15/2064
See application file for complete search history.

(56) References Cited

U.S. PATENT DOCUMENTS

| | | | | |
|---|---|---|---|---|
| 2,448,215 | A * | 8/1948 | George | F24C 15/102 99/398 |
| 3,866,687 | A * | 2/1975 | Banner | A62C 35/605 169/65 |
| 4,256,181 | A * | 3/1981 | Searcy | A62C 37/12 169/65 |
| 4,657,332 | A * | 4/1987 | Stillman | H01R 33/94 439/577 |
| 4,773,485 | A * | 9/1988 | Silverman | A62C 3/006 169/59 |
| 4,830,116 | A * | 5/1989 | Walden | A62C 2/04 169/17 |
| 5,127,479 | A * | 7/1992 | Stehling | A62C 3/006 285/31 |

(Continued)

*Primary Examiner* — Joseph A Greenlund
(74) *Attorney, Agent, or Firm* — Lambert Shortell & Connaughton; David J. Connaughton, Jr.; Justin P. Tinger

(57) ABSTRACT

The present invention provides a high-tech stove fire detector and suppression system comprising an exhaust hood and a stove unit with multiple burners on a cooktop. The exhaust hood includes an overhead unit with fire extinguisher nozzles to combat fires on the cooktop. Sensors detect smoke or fire, while the stove unit has a sensor for detecting the presence of a person within a 10-foot range. The system also features LED lights with video cameras, a ventilation display with an emergency turn-off button, and four power outlets. A mobile application allows remote control of the system, including burner and oven controls. This invention offers an efficient solution for fire detection, suppression, and remote management in any kitchen.

11 Claims, 6 Drawing Sheets

(56) References Cited

U.S. PATENT DOCUMENTS

| | | | | | |
|---|---|---|---|---|---|
| 5,297,636 | A | * | 3/1994 | North | A62C 3/006 |
| | | | | | 169/65 |
| 5,351,760 | A | * | 10/1994 | Tabor, Jr. | A62C 3/006 |
| | | | | | 169/59 |
| 5,697,450 | A | * | 12/1997 | Stehling | A62C 3/006 |
| | | | | | 367/199 |
| 5,871,057 | A | * | 2/1999 | Stehling | A62C 3/006 |
| | | | | | 367/199 |
| 6,029,751 | A | * | 2/2000 | Ford | A62C 3/006 |
| | | | | | 169/65 |
| 6,484,713 | B1 | * | 11/2002 | Schmitt | F24C 15/2021 |
| | | | | | 126/299 R |
| 8,895,904 | B1 | * | 11/2014 | Briones, Jr. | H05B 1/0266 |
| | | | | | 219/494 |
| 9,183,731 | B1 | * | 11/2015 | Bokhary | H04W 4/90 |
| 9,700,745 | B1 | * | 7/2017 | Bohrer | F24C 7/08 |
| 11,571,594 | B2 | * | 2/2023 | Furson | F24C 3/126 |
| 12,306,046 | B2 | * | 5/2025 | Bruno | G01J 5/026 |
| 2005/0126797 | A1 | * | 6/2005 | Mikulec | A62C 37/38 |
| | | | | | 169/65 |
| 2009/0294141 | A1 | * | 12/2009 | Rouse | A62C 3/006 |
| | | | | | 169/65 |
| 2010/0000747 | A1 | * | 1/2010 | Reynolds | F24C 15/2021 |
| | | | | | 169/65 |
| 2013/0341053 | A1 | * | 12/2013 | Rouse | A62C 35/605 |
| | | | | | 169/23 |
| 2015/0226439 | A1 | * | 8/2015 | Mikulec | A62C 3/006 |
| | | | | | 169/65 |
| 2017/0144002 | A1 | * | 5/2017 | Ben Neria | A62C 37/44 |
| 2017/0266473 | A1 | * | 9/2017 | Bohrer | A62C 3/006 |
| 2017/0299194 | A1 | * | 10/2017 | Kamei | F24C 7/08 |
| 2018/0163970 | A1 | * | 6/2018 | Boykiw | H02G 3/18 |
| 2020/0367692 | A1 | * | 11/2020 | Stipe | G06V 20/52 |
| 2021/0146174 | A1 | * | 5/2021 | Howlett | A62C 35/02 |
| 2021/0247074 | A1 | * | 8/2021 | Sinur | F24C 15/2021 |
| 2021/0256831 | A1 | * | 8/2021 | Ehrlich | G08B 27/006 |
| 2022/0010964 | A1 | | 1/2022 | Malcolm | |
| 2022/0249890 | A1 | * | 8/2022 | Furson | A62C 37/40 |
| 2023/0129115 | A1 | * | 4/2023 | Sinur | H04L 12/2816 |
| | | | | | 126/299 D |
| 2023/0152161 | A1 | * | 5/2023 | Bruno | G01J 5/042 |
| | | | | | 374/128 |
| 2023/0172399 | A1 | * | 6/2023 | Preston | A47J 44/00 |
| | | | | | 126/276 |
| 2024/0033548 | A1 | * | 2/2024 | Taylor | F24C 7/08 |
| 2025/0060109 | A1 | * | 2/2025 | Pamphile | A62C 3/006 |
| 2025/0121223 | A1 | * | 4/2025 | Livchak | A62C 37/48 |

* cited by examiner

HIGH TECH STOVE FIRE DETECTOR AND SUPPRESSION SYSTEM

TECHNICAL FIELD

This application relates in general to an article of manufacture for providing a fire safety system, and more specifically, to a system and method providing a high-tech stove fire detector and suppression system.

BACKGROUND

According to the National Fire Prevention Association (NFPA) stovetops are among the most dangerous appliances in any household, causing 62 percent of all house fires and 87 percent of household fire deaths. The next most dangerous is ovens, which account for 16 percent of house fires and 4 percent of house fire deaths. In fact, the NFPA reports that cooking fires are often traced to people engaging in unsafe behaviors, like removing batteries from smoke detectors and placing flammable materials near cooking surfaces. The organization urges people to take time to understand the fire dangers related to cooking, learn how to prevent them, and determine what actions to take if a cooking fire starts.

Therefore, a need exists for system and method for providing a high-tech stove fire detector and suppression system. The present invention attempts to address the limitations and deficiencies in prior solutions according to the principles and example embodiments disclosed herein.

SUMMARY

In accordance with the present invention, the above and other problems are solved by providing a system and method for a high-tech stove fire detector and suppression system according to the principles and example embodiments disclosed herein.

In one embodiment, the present invention is a system and method for providing a high-tech stove fire detector and suppression system.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
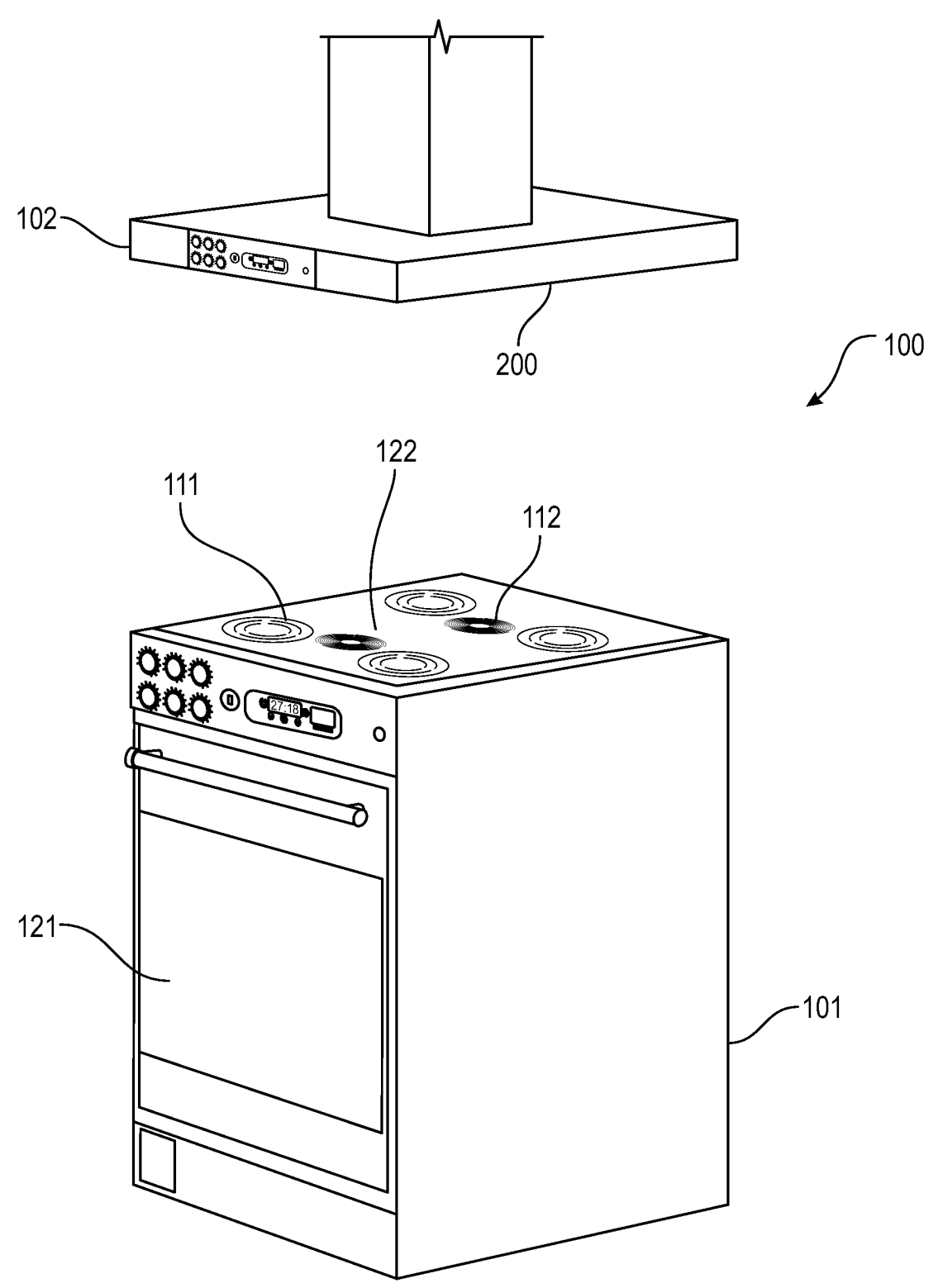
FIG. 1 illustrates a system for providing a high-tech stove fire detector and suppression system according to the present invention.

This application relates in general to an article of manufacture for providing a fire safety system, and more specifically, to a system and method providing a high-tech stove fire detector and suppression system according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

The terms "individual" and "user" refer to an entity, e.g., a human, using a system and method for providing a high-tech stove fire detector and suppression system according to the present invention. The term user herein refers to one or more users.

The term "invention" or "present invention" refers to the invention being applied for via the patent application with the title "High Tech Stove Fire Detector and Suppression System." Invention may be used interchangeably with fire detector.

In general, the present disclosure relates to a system and method for providing a high-tech stove fire detector and suppression system according to the present invention. Cooking fires are the number one cause of home fires and home fire-related injuries. They cause billions of dollars of property damage worldwide. Stove and kitchen fires usually grow out of control quickly. Negligent and unattended cooking are usually the leading causes. It is even worse in today's busy world because people engage in distracted cooking: distracted by stress, fatigue, phones, screens, and social media.

The high-tech stove fire detector and suppression system 100 works completely different from the other fire detector systems. This system 100 is designed to save life, protects property, and fight climate change. The system is capable of monitoring a stove from any location using a smartphone, other mobile device or a desktop computer.

Carbon monoxide from gas stoves can raise concentrations of the odorless gas to a dangerous amount in the home. Because carbon monoxide is a byproduct of combustion, it is formed as a gas as an oven heats up and cooks food. Deadly carbon monoxide gas is also produced by the gas flame that heats the oven.

All gas stoves and ovens produce carbon monoxide, to some extent. However, studies show that about half of all stoves raise concentrations of carbon monoxide in the kitchen beyond the 9 parts per million the EPA has established as the top safe level. To ensure the concentration of carbon monoxide in the house doesn't exceed this level, a range hood or fan is used when cooking to pull the gas out of the house.

Burning fossil fuels directly into your home is not amazing for your health, and it certainly isn't an ideal way to provide heat or cook when it comes to decreasing our carbon footprint, as individuals and as a society. But it's not often that we think of our gas stoves this way, even though it's absolutely no secret that these environmental and health concerns are real.

Gas stovetops have become a proxy battleground for the future of the planet. Some cities are trying to cut down their greenhouse gas emissions by getting rid of gas hookups in new construction. But the natural gas industry isn't going down without a fight. Pro-gas marketing campaigns have so far successfully waged a war in the kitchen, promoting gas stoves as superior to electric ranges. That's made it more difficult for cities like Seattle to pass mandates that would limit the use of gas in homes and buildings. What's at stake in this fight is a city's ability to cut down greenhouse gas emissions.

Further complicating things, the gas industry has, for decades, framed itself as a "cleaner" alternative to fossil fuels like coal and oil. "We should probably discuss the name of it: 'natural gas.'" says Panama Bartholomy, executive director of the nonprofit Building Decarbonization Coalition in California. "It has been perhaps one of the most successful marketing campaigns that we've seen from a large industry to call what is really a dangerous pollutant, something natural."

CO is a colorless, odorless gas created when a fuel is burned. Common fuels include natural gas, propane, gasoline, and wood. Since CO has no smell or taste, you cannot detect the gas with your senses. Dangerous concentrations of CO can build up indoors and cause illness before you realize you are being poisoned. Symptoms of CO poisoning are very similar to the flu. For most people, the first signs of exposure include headache breathlessness with mild exercise, dizziness, fatigue, and nausea.

FIG. 1 illustrates an article of manufacture providing a high-tech stove fire detector and suppression system 100 according to the present invention. The core function of this technology is to control and reduce a cooking fire and change the climate in the house.

The high-tech stove fire detector and suppression system 100 comprises a stove unit 101 having an oven 121 and a cooktop 122, an overhead exhaust hood 102, and a fire suppression subsystem 200. The oven 121 has a plurality of adjustable and movable shelves for holding items while within the oven 121. Particularly, in one embodiment, the oven 121 comprise four adjustable shelves. The cooktop 122 comprises a plurality of burners 111 of different sizes and a warming surface 112.

Figure 2:
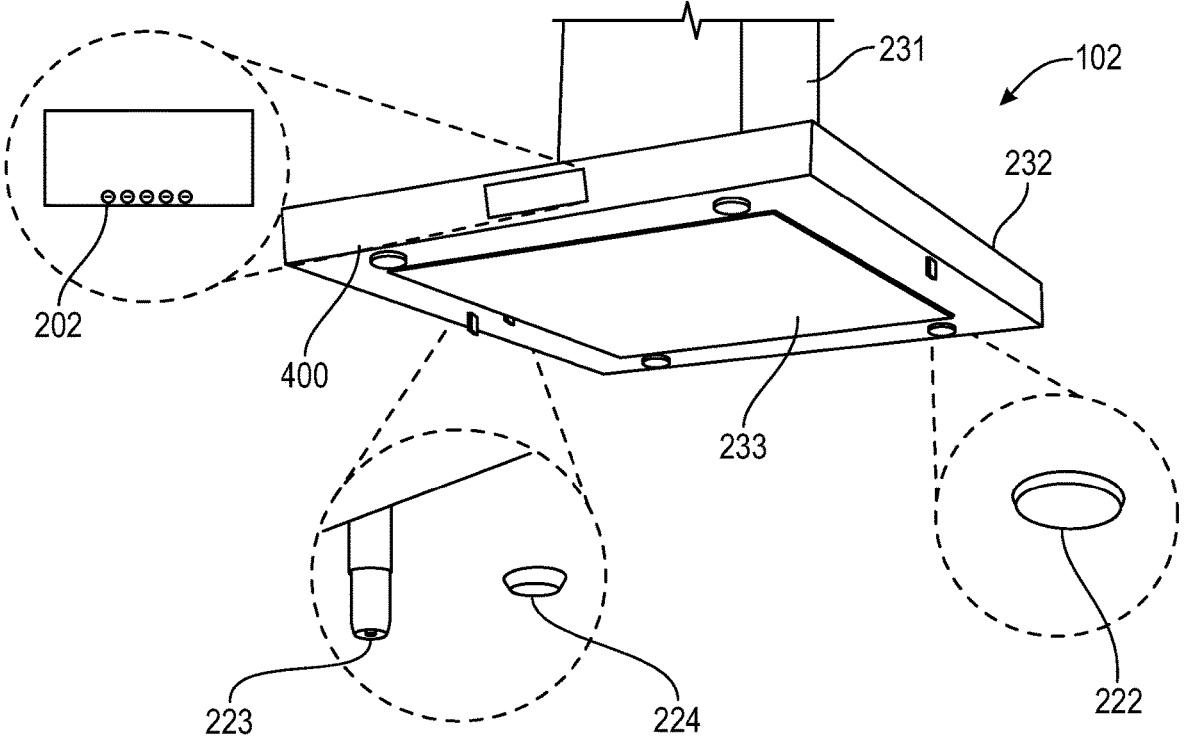
FIG. 2 illustrates a perspective view of an exhaust hood and ventilation system for the high-tech stove fire detector and suppression system according to the present invention.
Figure 3:
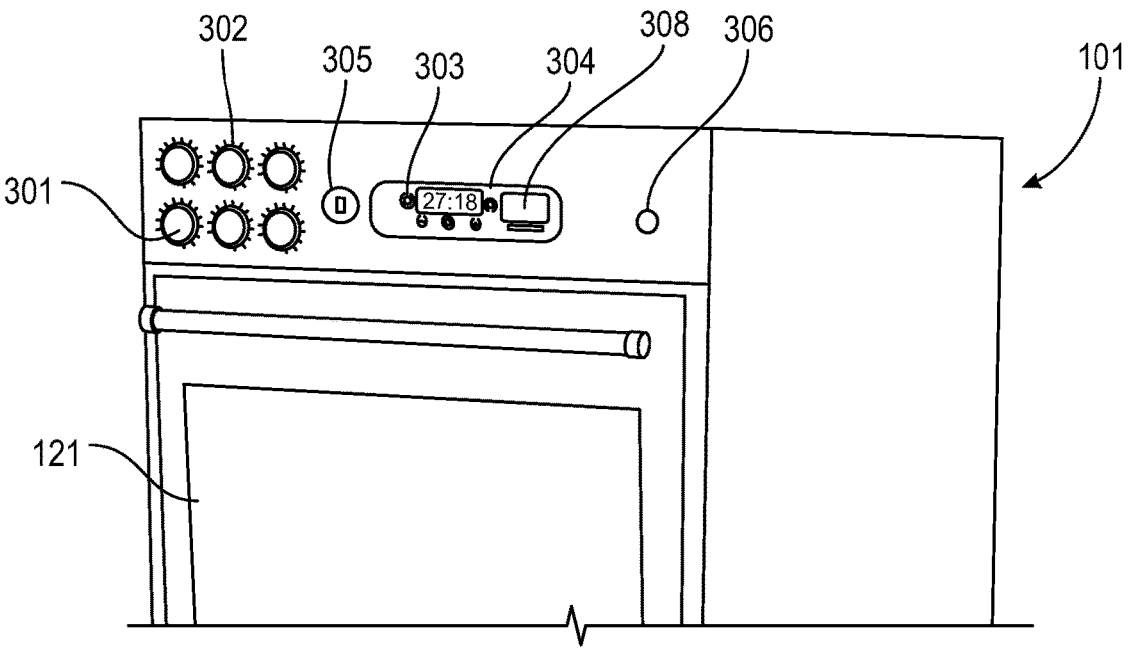
FIG. 3 illustrates a perspective view of a stove and oven for the high-tech stove fire detector and suppression system according to the present invention.
Figure 3:
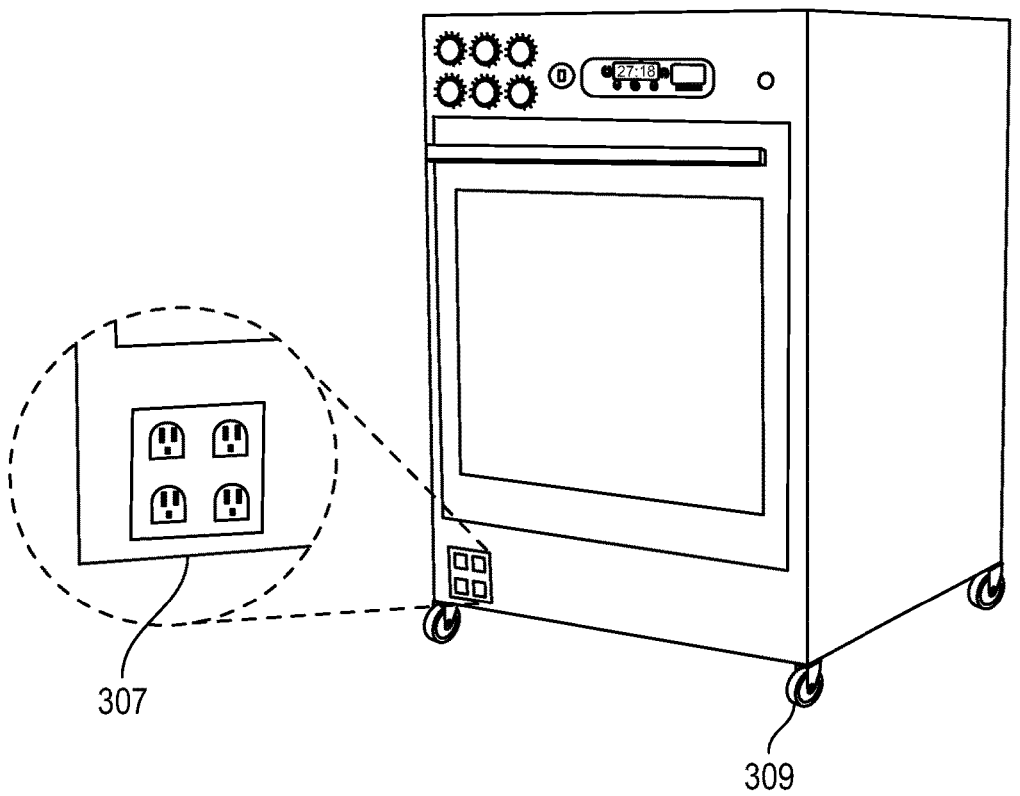
Figure 4:
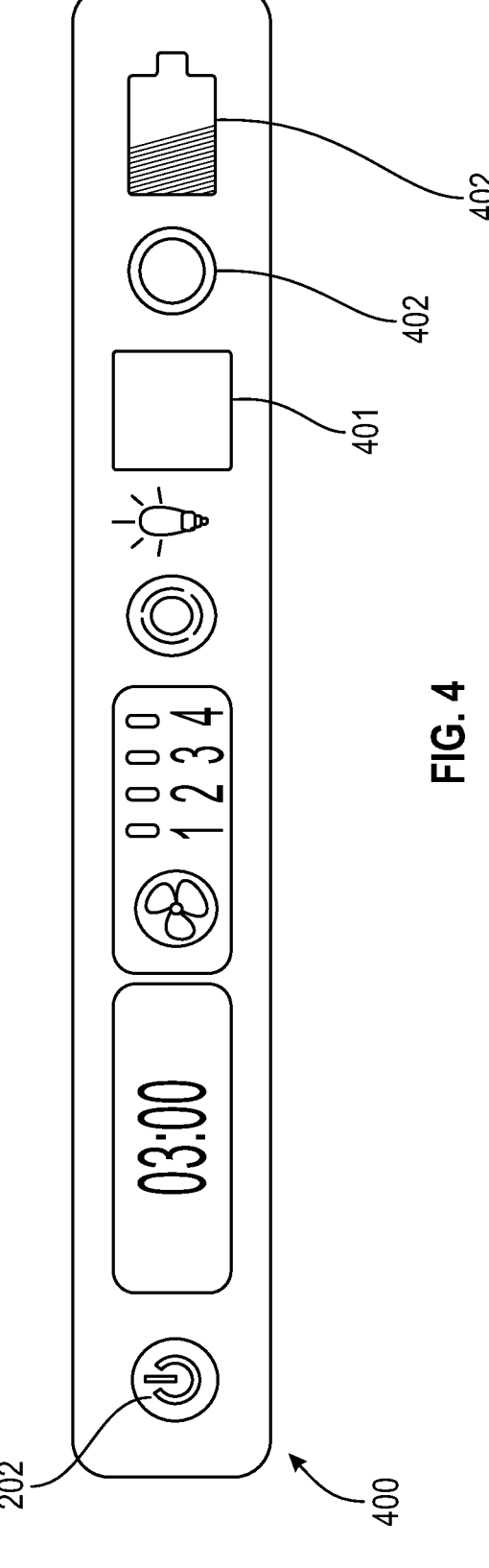
FIG. 4 illustrates a perspective view of a ventilation display for the exhaust hood and ventilation system for the high-tech stove fire detector and suppression system.

Turning now to FIG. 2, the exhaust hood 102 comprises a duct and exhaust vent 231, as well as a stainless-steel overhead unit 232. Additionally, it includes an emergency turn off push button 202. This push button 202 is used for manually turning off the system 100. In the case where no one is present to make a quick decision, the system 100 will automatically turn off. The exhaust hood 102 also features a filter unit 233, LED lights 222 with a video camera, and fire extinguisher nozzles 223 and at least one smoke/fire sensor 224. Moreover, a flexible exhaust duct connects to both the stove and oven to vent outside. To address the possibility of a major fire, fire extinguisher nozzles 223 are positioned above the stove topper and oven.

The LED lights 222 with a video camera are positioned on the underside of the exhaust hood 102 to provide a video view of the stove 101 in using a mobile application 501 on a mobile device 500, such as a smartphone, tablet, laptop, and smart watch. Burner and control switch LED lights are on when the stove is working.

A burner control switch 301 may turn on each burner 111 to one of a plurality of settings, for example warm-low-medium-high 302, which may be displayed conventionally or digitally around the control switch 301. In one embodiment, a switch 301 activates the burners 111, a switch 303 activates the oven 121 in a bake and broil setting, a switch 304 activates the oven 121 in a baking only setting, and a switch 305 activates the burners 111 in a boiling only setting. When touching a control switch 301, which may be a turning swift, a light on the respective burner 111 will blink to indicate the right burner 111 is in use, preventing inadvertent burner activation.

A bracket may be required to support a 45° to 90° overhead topper (i.e., a structure that is placed above the stove to direct smoke and heat upward). This bracket can be installed either through a ceiling or a wall, depending on the location of the range in the house. Regarding cleaning, there is no need for cleaning "up and down." However, the external ventilation system, which consists of a fan and a filter, may require periodic cleaning. The ventilation system helps exhaust smoke and odors from the house. When the system is operational, a green light in front of the ventilation indicates that the filter is functioning properly. When the green light changes to yellow, it indicates that the filter will need cleaning or replacement soon. The system will continue to operate with a flashing yellow light until the filter is cleaned or replaced. If the filter light turns red, the system will stop working until the filter is cleaned or replaced. Once the stove 101 is turned on, the ventilation exhaust speed may increase if the exhaust hood 102 detects significant cooking activities or a burning smell.

The detection of a burning smell, smoke, carbon monoxide, or other potential airborne toxins may be facilitated by a sensor 224 located in the ventilation system. For example, when the system detects a burning smell, the fan speed will automatically increase, and the stove 101 system will shut down. When the system 100 shuts down automatically due to any dangerous condition and/or fire, the ventilation generated by the exhaust hood 102 will continue to operate until the burning smell is no longer detected. The ventilation will ensure that there is no lingering smell, unless someone deactivates the exhaust hood 102 using a main switch 202.

In one embodiment, the stove 101 incorporates a 72 to 100 hour emergency backup battery, which is located at the back of the stove. In case of a power outage, a solar power system (not shown) can be connected to the emergency backup battery to recharge it when the electric power is not restored. The stove 101 may feature four power outlets 307 that can be used for lighting, radio, and TV purposes.

An alert system may operate through the set of four power outlets 307 located in front of the stove at the bottom. This alert system triggers when the charge level of the emergency backup battery drops below a specified voltage. The display indicating the battery's charge status is located on both the stove and the ventilation system, and it activates when the main power supply is disrupted. Additionally, the display can be viewed on an accompanying mobile app 501 if an internet connection is available. The mobile app may provide information about the battery charge level and remaining battery life.

In one embodiment, the stove features a unique configuration. The uniquely configured stove comprises two distinct oven units: a top oven unit and a bottom oven unit. Each unit is equipped with its own exhaust fan. To facilitate mobility and cleaning, the stove may be fitted with four small wheels or casters. In this embodiment, a smart dial streamlines oven settings, condensing them into a single, easy-to-use control while adapting to individual cooking preferences.

Furthermore, one embodiment of the stove may include an innovative air fry capability, complete with a dishwasher-safe air frying tray that allows oil-free preparation of fried foods, promoting healthier cooking. Additionally, a self-clean function is integrated. Both the top and bottom oven units and are equipped with built-in lighting and cameras. Flexibility is a key feature, as the stove can be configured to heat either the top oven unit, the bottom oven unit, or both simultaneously. Also, in this embodiment, the self-clean features operates for approximately two minutes, streamlinging maintenance and enhancing user convenience.

It is important to note that every stove has adjustable cooking levels to prevent burning food. For children's safety, there may be a master switch 202 located on the ventilation display 400. This switch 202 can be easily turned on and off to prevent children from operating the stove. The oven 121 may have a digital temperature reading 308 that is generated internally and displayed on the front of the stove. This reading 308 is automatically updated to reflect the current temperature. To facilitate mobility and cleaning, the stove is fitted with four small wheels or casters 309. In one embodiment, the wheels or casters 309 are covered by a cases to make them appear like conventional appliance legs, providing an inconspicuous and aesthetically appealing option. Video cameras are installed in the oven 121 and underneath the exhaust hood 102. These cameras are positioned to provide a view of the food while it is being cooked on the stovetop 122.

In one embodiment, if someone does not respond within 25 seconds to the low water level alert, both the stove 101 and the mobile application 501 will emit beeping signals to request attention. As a safety measure, the system 100 will automatically turn off the respective burner 111 that triggered the alert. In one embodiment of the mobile application 501, it may not be possible to turn on the specific burner 111 experiencing the low water level issue unless someone is physically present in the house to inspect the pan and manually turn on the burner. The detection of low water levels is applicable specifically during frying. On the stove, there may be a sensor 306 that consistently searches for the presence of someone within a 10-foot range from the stove. This sensor 306 may always be active and monitoring the surrounding area.

The mobile application 501 provides the user with the ability to remotely turn on or off any burner 111 using any computing device. In the event that there is no internet connection, the system 100 may still be able to function manually. This means that someone may need to be present in the house to handle the cooking or cleaning tasks. For example, during frying, a sensor 306 within or on the stove is activated. This sensor 306 is designed to detect the presence of an attendant within a 10-foot radius around the stove 101. When frying, it may be necessary that someone continuously monitors the cooking process within this 10-foot range. If the person moves outside of this range, the system 100 will sound an alert for approximately 45 seconds. Additionally, the system 100 may not allow remote control of the burner for frying food through the mobile application 501. Similarly, a self-clean features operates for approximately two minutes, streamlinging maintenance and enhancing user convenience; however, the sensor 306 may also prevent operation of the two-minute self clean feature when a person is not nearby. The two-minute self clean feature facilitates cleaning of the stove 101 and oven 121. All that is required after the two-minute self clean feature finishes is for a person to wipe the inside and outside of the stove 101 and/or oven 121.

Regarding communication with the mobile app 501, the system's operations, rules, and operating restrictions are managed by software. If frying remotely, the system will shut down and cannot be reset remotely. The computer device installed in the ventilation system will regulate the 10-foot range monitored by the sensor, and all functions will be controlled through software.

It is recommended to clean and maintain the stove's overhead vent and filter on a monthly basis. The time for cleaning can be determined using the ventilation display 400, where a filter light 401 provides the following indications:

1. Green filter light: It signifies that the filter is clean.
2. Yellow filter light: It indicates that the filter requires cleaning or replacement.
3. Red filter light: It signals that the stove system will automatically shut down until the filter is cleaned or replaced.

Additionally, the ventilation display 400 includes a child safety light and/or safety switch button 402 and a battery percentage display light 403. The child safety light and/or safety switch button 402 is meant to prevent children from turning on the stove.

An alert may be generated by the system 100 when the exhaust hood 102 requires cleaning. Neglecting to clean the exhaust hood 102 can result in the stove system 101 shutting down. In the event of smoke or flames, the stove system 101 will shut down, and the exhaust fan speed will automatically increase until the smoke dissipates. The exhaust hood 102 can also be utilized to purify the air in the house. This purification process is controlled automatically. A sensor located in the ventilation system, governed by software, detects the need for air purification. It will turn the exhaust hood 102 on and off accordingly to maintain the desired air quality in the house.

Two double fire extinguisher nozzles 223 are on both sides over the stovetop 122 and oven 121 in case of fire in order to extinguish a fire. At the same time, all components of the system 100 will go down automatically, except the exhaust hood 102. The fan in the exhaust hood 102 continues to operate until someone manually turns it off. The exhaust fan will continue to vent smokey air to the outside after the flames are extinguished.

The ventilation system will be equipped with two sensors 224, each positioned to cover one side of the stove. These sensors 224 operate by detecting any objects within a 10-inch proximity to the stove. When an object is detected, an alert will be triggered. If the object is not removed, it will result in an automatic system shutdown. The purpose of these sensors is to identify and alert against the presence of any items such as rags, paper, wood, or plastic that are positioned too close to the burners 111. The system 100 is designed to generate visual and auditory alert signals to prompt the removal of these items. If the objects are not removed in a timely manner, the system will initiate an automatic shutdown as a safety measure.

The stove 101 is equipped with a sensor 306 located in front of it. This sensor is designed to detect when children are approaching too closely to the stove while it is in use. When the sensor detects the presence of children, it will trigger an alert. To ensure child safety, all the controls of the stove, located in front of the stove, will be disabled when the stove 101 is not in use. This measure may prevent children from playing with the controls. In the event that the stove is not in use and a child attempts to touch the controls, the system will detect the child's presence. As a safety precaution, the system will remain off and generate an alert both within the house and through the mobile application 501. This ensures that the stove remains inactive and prevents any potential accidents involving children interacting with the controls.

Figure 5:
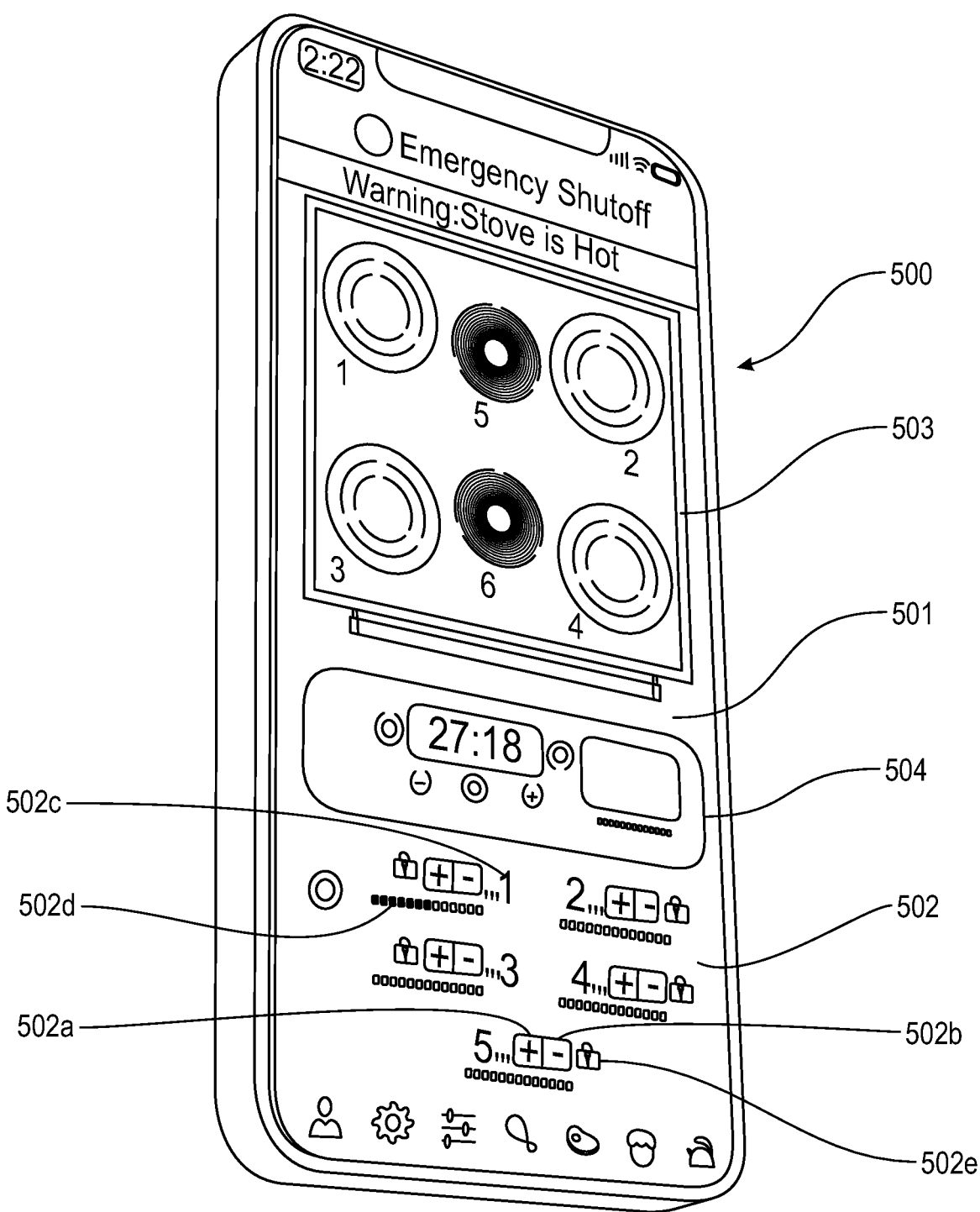
FIG. 5 illustrates a perspective view of a mobile application displayed on a mobile device for interoperability with the high-tech stove fire detector and suppression system.

FIG. 5 illustrate additional views of components in a system and method providing a high-tech stove fire detector and suppression system within a mobile application 501 according to the present invention. FIG. 5 shows a front view of the user interface screen of a mobile application 501 on a mobile device 500 used to implement the high-tech stove fire detector and suppression system according to the present invention. FIG. 5 also shows a view of the stove burner user interface controls 502 on the user interface screen of a mobile application 501 that comprises the high-tech stove fire detector and suppression system according to the present invention.

FIG. 5 further shows a top view 503 of the stove 101 of the high-tech stove fire detector and suppression system within the mobile application 501. The cooktop 122 is visible in the mobile application 501 with the image generated by the LED lights 222 with a video camera on the exhaust hood 102. The burners 111 and warming area are visible with an operating state for each indicated by colors within the image.

A view of the cooktop 122 is shown above the burners 111 and a view of the oven controls 504 appear on a center portion of the user interface screen. The oven controls 504 display temperature values within the oven 121 and provide touch screen controls on the oven and mobile app 501 to set a desired temperature within the oven 121.

A set of burner controls 502 is displayed within a lower area of the portion of the user interface screen for the mobile app 501. An increase burner temperature control 502a and a decrease burner temperature control 502b are shown side by side. Activating either of these causes the mobile application 501 to transmit a command to the stove 101 to adjust the temperature setting of the corresponding burner 111. A current setting value 502c is shown to the right of the increase burner temperature control 502a and the decrease burner temperature control 502b. The current setting value 502c is displayed as a digital value between 1 and 10. The current temperature of the corresponding burner 111 is displayed in a temperature bar 502d below the other burner control elements. A burner disable lock 502e is positioned adjacent at least one of the increase burner temperature control 502a or the decrease burner temperature control 502b. The burner disable lock 502e provides a child proof mechanism to prevent accidental activation of the corresponding burner 111 when the burner is not in use.

The system encompasses various operating functions and features that are facilitated by the computing components. These computing components enable automation and integration of multiple processes. Here are some details about the system's capabilities:

1. State Data Acquisition: The computing components collect real-time information about the current condition of the stove. This includes data related to temperature, burner usage, airflow, and any detected anomalies or malfunctions.

2. Mobile Application Integration: The system is designed to communicate and synchronize with a mobile application. Users can remotely monitor and control the stove's operation through the application. They can receive notifications, adjust settings, and access information about the stove's status.

3. System Control: The computing components govern the operation of various parts within the system. They manage functions such as burner control, ventilation control, fire detection, and suppression mechanisms. The control is executed based on predefined algorithms and safety protocols.

4. Fire Detection: The system employs advanced fire detection mechanisms, which may include temperature sensors, flame detectors, and smoke detectors. These sensors continuously monitor the stove area and surrounding environment for any signs of fire or hazardous conditions.

5. Fire Suppression: In the event of a fire or potentially dangerous situation, the system activates fire suppression measures. This could involve mechanisms like automated extinguisher systems, water sprinklers, or gas cutoff valves. The suppression system is designed to swiftly respond and mitigate fire risks.

6. Database Integration: The computing components utilize a comprehensive database that houses relevant information and instructions for the system's operation. This database contains programmed instructions, safety guidelines, user preferences, and historical data for analysis and optimization.

Figure 6:
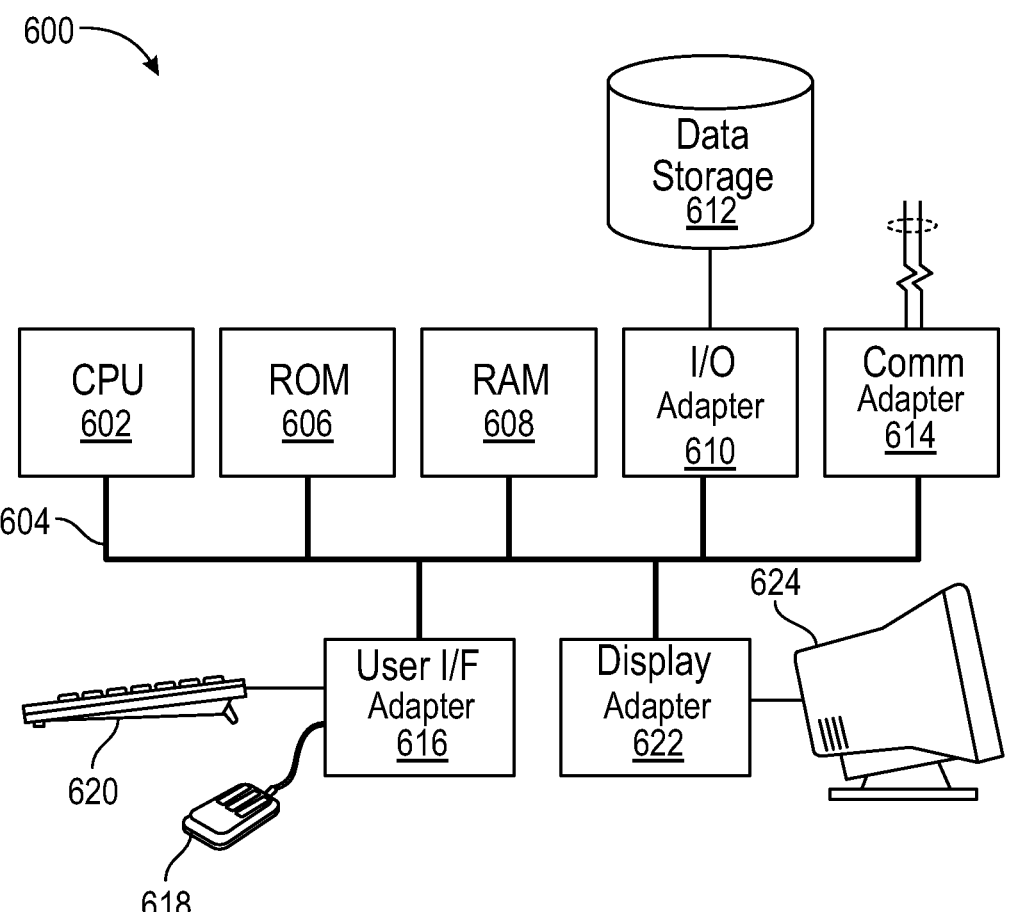
FIG. 6 illustrates a a generalized schematic of a programmable processing system utilized as the various computing components described herein used to implement an embodiment of the present invention.

FIG. 6 illustrates a generalized schematic of a programmable processing system utilized as the various computing components described herein used to implement an embodiment of the present invention. The central processing unit ("CPU") 602 is coupled to the system bus 604. The CPU 602 may be a general-purpose CPU or microprocessor, graphics processing unit ("GPU"), and/or microcontroller. The present embodiments are not restricted by the architecture of the CPU 602 so long as the CPU 602, whether directly or indirectly, supports the operations as described herein. The CPU 602 may execute the various logical instructions according to the present embodiments.

The computer system 600 also may include random access memory (RAM) 608, which may be synchronous RAM (SRAM), dynamic RAM (DRAM), synchronous dynamic RAM (SDRAM), or the like. The computer system 600 may utilize RAM 608 to store the various data structures used by a software application. The computer system 600 also may include read-only memory (ROM) 606 which may be PROM, EPROM, EEPROM, optical storage, or the like. The ROM 606 may store configuration information for booting the computer system 600. The RAM 608 and the ROM 606 hold user and system data, and both the RAM 608 and the ROM 606 may be randomly accessed.

The computer system 600 also may include an input/output (I/O) adapter 610, a communications adapter 614, a user interface adapter 616, and a display adapter 622. The I/O adapter 610 and/or the user interface adapter 616 may, in certain embodiments, enable a user to interact with the computer system 600. In a further embodiment, the display adapter 622 may display a graphical user interface (GUI) associated with a software or web-based application on a display device 624, such as a monitor or touch screen.

The I/O adapter 610 may couple one or more storage devices 612, such as one or more of a hard drive, a solid-state storage device, a flash drive, a compact disc (CD) drive, a floppy disk drive, and a tape drive, to the computer system 600. According to one embodiment, the data storage 612 may be a separate server coupled to the computer system 600 through a network connection to the I/O adapter 610. The communications adapter 614 may be adapted to couple the computer system 600 to the network, which may be one or more of a LAN, WAN, and/or the Internet. The communications adapter 614 may also be adapted to couple the computer system 600 to other networks such as a global positioning system (GPS) or a Bluetooth network. The user interface adapter 616 couples user input devices, such as a keyboard 620, a pointing device 618, and/or a touch screen (not shown) to the computer system 600. The keyboard 620 may be an on-screen keyboard displayed on a touch panel. Additional devices (not shown) such as a camera, microphone, video camera, accelerometer, compass, and or gyroscope may be coupled to the user interface adapter 616. The display adapter 622 may be driven by the CPU 602 to control the display on the display device 624. Any of the devices 602-622 may be physical and/or logical.

The applications of the present disclosure are not limited to the architecture of the computer system 600. Rather the computer system 600 is provided as an example of one type of computing device that may be adapted to perform the functions of a computing device and/or the user interface device 610. For example, any suitable processor-based device may be utilized including, without limitation, personal data assistants (PDAs), tablet computers, smartphones, computer game consoles, and multi-processor servers. Moreover, the systems and methods of the present disclosure may be implemented on application-specific integrated circuits (ASIC), very large-scale integrated (VLSI) circuits, state machine digital logic-based circuitry, or other circuitry.

The embodiments described herein are implemented as logical operations performed by a computer. The logical operations of these various embodiments of the present invention are implemented (1) as a sequence of computer-implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules. As such, persons of ordinary skill in the art may utilize any number of suitable electronic devices and similar structures capable of executing a sequence of logical operations according to the described embodiments. For example, the computer system 600 may be virtualized for access by multiple users and/or applications.

Even though particular combinations of features are recited in the present application, these combinations are not intended to limit the disclosure of the invention. In fact, many of these features may be combined in ways not specifically recited in this application. In other words, any of the features mentioned in this application may be included in this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A system for providing a high-tech stove fire detector and suppression system, comprising:

an exhaust hood and a stove unit, the stove unit housing an oven;

wherein the stove unit includes a proximity sensor, configured to search for a person within a predetermined distance in response to the stove unit frying, and configured to send an alert in response to that the person is not found;

wherein, the stove unit frying is indicated by a detection of a low water level;

wherein the stove unit comprises a plurality of burners positioned on a cooktop of the stove unit;

wherein the exhaust hood comprises an overhead unit connected to a vent;

wherein the overhead unit is positioned above the stove unit; and wherein the exhaust hood further comprises a plurality of fire extinguisher nozzles on a bottom surface of the overhead unit for extinguishing a fire on the cooktop;

the system further comprising a mobile application accessible via a mobile device, wherein the mobile application is operable to remotely control at least one of the exhaust hood or the stove unit;

wherein the remote control of the stove unit from the mobile application is disabled in response to the stove unit frying.

2. The system of claim 1 wherein the exhaust hood further comprises at least sensor for detecting smoke or fire on the bottom surface of the overhead unit.

3. The system of claim 1, wherein the predetermined distance is 10 feet.

4. The system of claim 1 wherein the stove further comprises four power outlets for connection to an external device.

5. The system of claim 1 wherein the exhaust hood further comprises a plurality of LED lights with video cameras on the bottom surface of the overhead unit.

6. The system of claim 1 wherein the exhaust hood further comprises a ventilation display on a front face of the overhead unit.

7. The system of claim 6 wherein the exhaust hood further comprises an emergency turn off push button in the ventilation display.

8. The system of claim 1 wherein the mobile application is operable to display a plurality of user interface controls for controlling at least one of the plurality of burners or the oven.

9. The system of claim 1 wherein the mobile application is operable to display a top view of the cooktop of the stove unit.

10. The system of claim 1, wherein the alert is a beeping signal emitted by the stove unit.

11. The system of claim 1, wherein the alert is a beeping signal emitted by the mobile device.

* * * * *